UNITED STATES PATENT OFFICE.

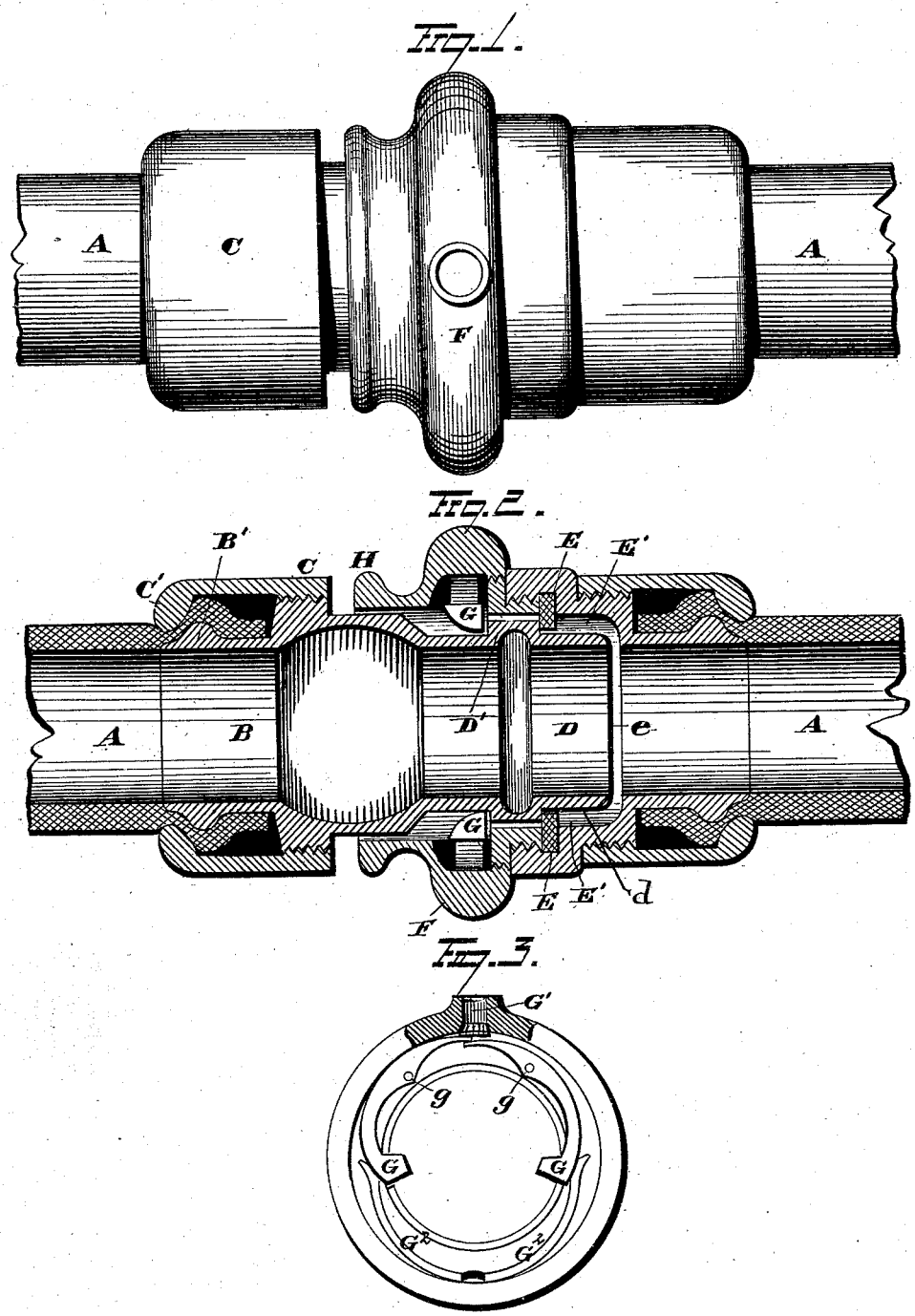

EUGENE P. SMITH AND MARTIN DUNN, OF DETROIT, MICHIGAN.

HOSE-COUPLING.

SPECIFICATION forming part of Letters Patent No. 235,580, dated December 14, 1880.

Application filed March 15, 1880. (No model.)

*To all whom it may concern:*

Be it known that we, EUGENE P. SMITH and MARTIN DUNN, of Detroit, county of Wayne, State of Michigan, have invented a new and useful Improvement in Hose Attachments; and we declare the following to be a full, clear, and exact description of the same, such as will enable others skilled in the art to which it pertains to make and use it, reference being had to the accompanying drawings, which form a part of this specification.

The improvements relate to the mechanism for fastening the end of the hose upon the coupling, and also to the mechanism for coupling together two adjacent sections, as will be hereinafter described, and more particularly pointed out in the claims.

In the drawings, Figure 1 is an external view of our coupling. Fig. 2 is a longitudinal sectional view of same. Fig. 3 is a cross-section illustrating the spring-catch and releasing mechanism.

We will first describe the mechanism for attaching the hose to the coupling.

A is the hose. B is a cylindrical projection, which extends from the coupling, as a bushing, into the end of the hose. B' is a shoulder upon the outer surface at or near the end of the bushing B. The said shoulder is formed with a curved concavity presenting toward the outer end of the bushing, and is then curved over into the form of a convex annular ridge. The hose A is slipped over this shoulder and upon the part B.

C is a sleeve, screw-threaded to engage with a corresponding thread upon the coupling. This sleeve is provided at its end upon its inner surface with an annular shoulder or flange, C', being convexed upon its interior face to correspond with the curved concavity in the shoulder B'.

The operation of this portion of our device is as follows: The sleeve C having been slipped upon the hose, the end of the hose is drawn over the shoulder B' onto the bushing B. The sleeve C is then brought forward and its screw-thread engaged with that upon the coupling. As the sleeve is screwed farther on, the body of the hose is clamped tightly between the shoulder B' and the flange C', and is held firmly to the coupling, and the joint is securely packed against leakage. The shoulder B' and flange C', being curved, as shown, firmly clamp the hose without liability of cutting the latter. Moreover, the flange being convexed, to correspond with the concave form of the shoulder B', the clamping action is distributed over a considerable length of the hose, so that the strain which would usually come upon a single line in case the shoulders are clamped upon a single line of the hose is, by our device, distributed over a considerable surface. On the other hand, the surface clamped is not so extended as to practically prevent the hose being sufficiently clamped to effect a secure fastening and a perfectly water-tight joint.

We will now describe that part which relates to the mechanism for uniting the two adjacent sections of hose.

D is a neck extending from one section of the coupling and adapted to enter the throat of the other section, thus constituting the male and female portions of the device. The neck D is provided with an annular shoulder or rib, D', while the throat of the female section is provided with an interior gasket, E, so located that when the two sections are brought together the gasket will rest against the front of the shoulder D'. The section F is also provided with latches G, which extend into the interior in such relation to the gasket that when the sections are slipped together the shoulder D' will first press back the latches, then ride past them, and the latches will then spring in behind the shoulder and prevent the sections from disengaging.

The latches are formed in any suitable manner, the construction shown in Fig. 3 being well suited for the purpose, in which G are the latches, pivoted at $g$, their ends lapping past each other and engaging with the stud G'.

A spring, $G^2$, holds the latches down, except when intentionally disengaged, by pressing in the stud G'. The same object may be accomplished without the stud by inserting a suitable tool through the opening and pressing against the latches; but the stud serves to fill the hole and prevent dirt from getting within and impairing the operation of the latches.

Back of the gasket is an annular cavity, E', and the male and female portions of the coupling are sufficiently separated at $e$ to permit the water to enter and exert its pressure against the gasket to hold it firmly against the shoulder D' and prevent any leakage. In order to couple two sections together, it is only necessary to slip one within the other and the result is accomplished automatically; and to disengage them, pressure is exerted against the stud G', thus releasing the latches, and the sections are then drawn apart. Once engaged, the sections can be twisted, the one upon the other, without impairing the joint, thus constituting a coupling which is flexible, so as to prevent twisting of the hose.

The portion $d$ of the neck may, if desired, be made slightly tapering from the shoulder D' to the end of the neck, so that the gasket will not come to a bearing upon it until it comes up to the shoulder; then, in uncoupling, the friction of the gasket on the neck would be relieved the moment the sections begin to separate.

When water is to be sucked through the hose there should be a gasket located at H, and made to close upon its seat by the atmospheric pressure from without.

We are aware that a hose-coupling has been formed of an inner ring provided with a concave projection on its outer surface and two outer rings united by screw-threads, said outer rings being constructed with convex inner surfaces, whereby the three parts, when united, form a curved intervening chamber equal in width to the thickness of the hose, within which chamber or space the end of the hose is secured by screwing down the outer ring. In the construction of hose-coupling above set forth the hose is secured in place by forming a bend in the end thereof and clamping this bent or curved portion between the three rings. We make no claim to such construction of hose-coupling. In our improved device the end of the hose is secured by compressing or pinching the end of the hose, and hence the extreme end of the hose may be acted upon by our improved device, while in the device above referred to a considerable length of the hose is necessarily employed to insure the attachment.

What we claim is—

1. In a hose-coupling, the combination, with a bushing, B, provided with an external shoulder, B', having a concave bearing on its outer side and an annular groove between said shoulder and screw-threaded portion, of a sleeve, C, provided at its outer end with an internal flange, C', having a convex bearing on its inner side, and formed with a plain cylindrical interior portion between said flange and its screw-threaded portion, the adjacent surfaces of shoulder B' and flange C' being located practically in the same horizontal plane, whereby the extreme end of the hose will be situated within the enlarged space within said shoulder and flange, and a portion of the hose be firmly compressed between the concave and convex faces of said parts, substantially as described.

2. In a hose-coupling, the latches G, stud G', and spring $G^2$, substantially as and for the purposes described.

In testimony whereof we sign this specification in the presence of two witnesses.

EUGENE P. SMITH.
MARTIN DUNN.

Witnesses:
WM. M. PORTER,
RICHARD FILBAN.